United States Patent
Oh et al.

(10) Patent No.: US 7,773,500 B2
(45) Date of Patent: Aug. 10, 2010

(54) TRANSMITTING APPARATUS FOR TRANSMITTING IN A MULTI-CARRIER SYSTEM USING MULTIPLE ANTENNAS AND RECEIVING APPARATUS IN THE SAME SYSTEM

(75) Inventors: Jong-Ee Oh, Daejeon (KR); Dong-Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 92 days.

(21) Appl. No.: 12/096,520

(22) PCT Filed: Dec. 4, 2006

(86) PCT No.: PCT/KR2006/005168

§ 371 (c)(1),
(2), (4) Date: Jun. 6, 2008

(87) PCT Pub. No.: WO2007/066935

PCT Pub. Date: Jun. 14, 2007

(65) Prior Publication Data

US 2008/0298225 A1     Dec. 4, 2008

(30) Foreign Application Priority Data

Dec. 7, 2005    (KR) .................... 10-2005-0118750

(51) Int. Cl.
*H04J 11/00*     (2006.01)
(52) U.S. Cl. ................... 370/206; 370/203; 370/208; 375/260; 375/267
(58) Field of Classification Search ............... 370/203, 370/206, 208, 210; 375/260, 267
See application file for complete search history.

(56) References Cited

U.S. PATENT DOCUMENTS 7,218,689 B2    5/2007    Gupta (Continued)

FOREIGN PATENT DOCUMENTS

EP    1 531 594    5/2005

(Continued)

OTHER PUBLICATIONS

Xiaoli Ma et al., Full-Diversity Full-Rate Complex-Field Space-Time Coding, Nov. 2003, pp. 2917-2930, vol. 51, No. 11.

(Continued)

*Primary Examiner*—Ricky Ngo
*Assistant Examiner*—Rasheed Gidado
(74) *Attorney, Agent, or Firm*—Jae Y. Park; Kile Goekjian Reed & McManus PLLC

(57) ABSTRACT

A transmitting apparatus and receiving apparatus of a multi-carrier system using multiple antennas is proposed. A linear complex field (LCF) encoder performs linear precoding of input signals to be transmitted using a linear complex matrix based on the number of antennas and the number of subcarriers, and a subcarrier allocator allocates a subcarrier to each precoded signal. A transmitter transmits the signals through the multiple antennas. In a receiving apparatus, a subcarrier de-allocator extracts a linear-precoded signal by de-allocating a subcarrier of the received signal, and an LCF decoder outputs a bit reliability of the received signal based on the number m of antennas and the number n of subcarriers. Performance may be improved by using space diversity using multiple antennas and frequency diversity using OFDMA, and system complexity may be reduced by using a lattice reduction and a 2-branch Chase decoder.

18 Claims, 7 Drawing Sheets

U.S. PATENT DOCUMENTS

| | | | |
|---|---|---|---|
| 7,586,990 B2 * | 9/2009 | Subramanian et al. | 375/260 |
| 2005/0099937 A1 * | 5/2005 | Oh et al. | 370/207 |
| 2005/0105631 A1 * | 5/2005 | Giannakis et al. | 375/267 |
| 2005/0128936 A1 * | 6/2005 | Shao | 370/208 |
| 2007/0140102 A1 | 6/2007 | Oh et al. | |
| 2007/0253496 A1 * | 11/2007 | Giannakis et al. | 375/260 |

FOREIGN PATENT DOCUMENTS

| | | |
|---|---|---|
| KR | 10-2004-0061005 | 7/2004 |
| KR | 10-2005-0020457 | 3/2005 |
| KR | 10-2005-0027186 | 3/2005 |
| KR | 10-2005-0045765 | 5/2005 |
| KR | 10-2004-0002027 | 11/2005 |
| WO | 02/062002 | 8/2002 |

OTHER PUBLICATIONS

Siavash M. Alamouti, A Simple Transmit Diversity Technique for Wireless Communications, Oct. 1998, pp. 1451-1458, vol. 16, No. 8.

Jun Tan et al., Multicarrier Delay Diversity Modulation for MIMO Systems, Sep. 2004, pp. 1756-1763, vol. 3, No. 5.

Ghaya Rekaya, A Very Efficient Lattice Reduction Tool on Fast Fading Channels, Oct. 10-13, 2004, pp. 714-717, Parma, Italy.

International Search Report-PCT/KR2006/005168 dated Jun. 9, 2008.

Written Opinion-PCT/KR2006/005168 dated Jun. 9, 2008.

* cited by examiner

[Fig. 1]
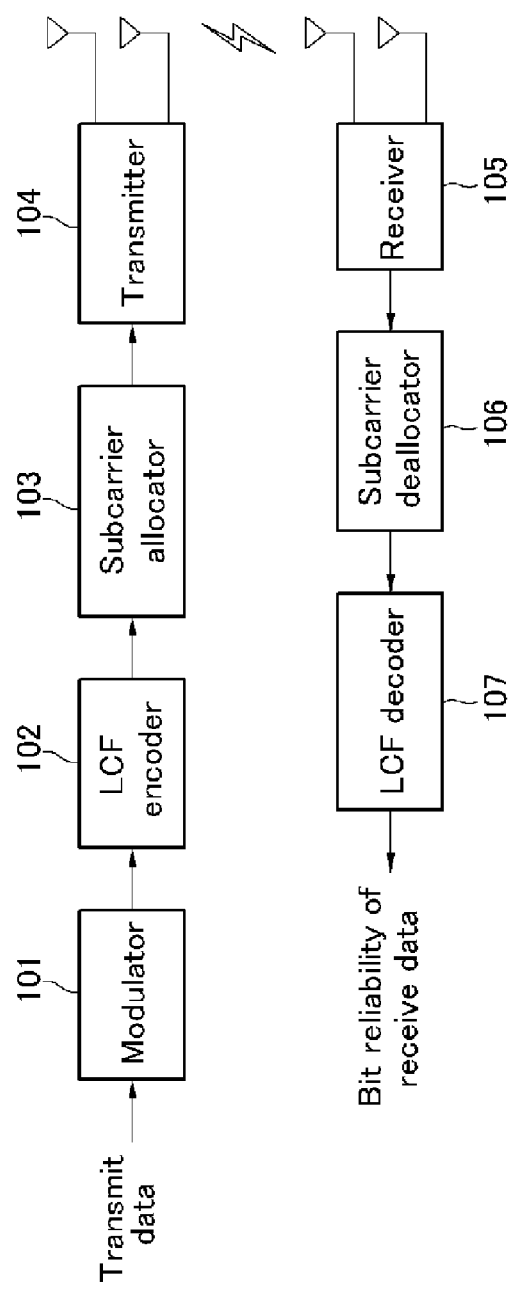

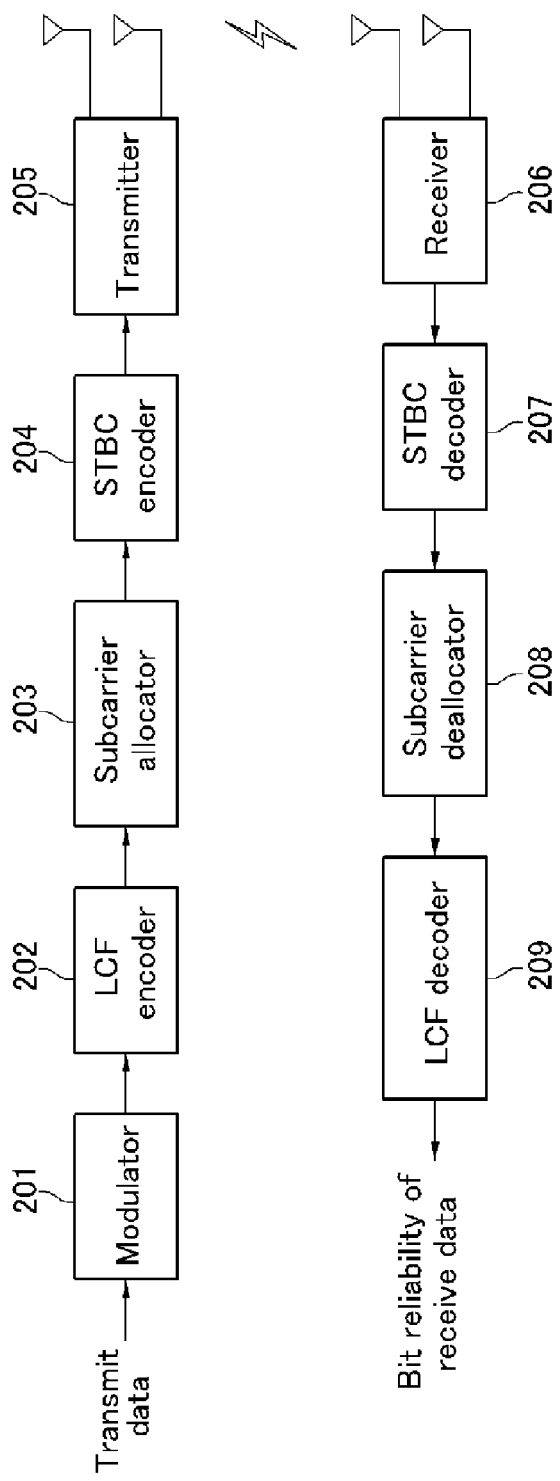
[Fig. 2]

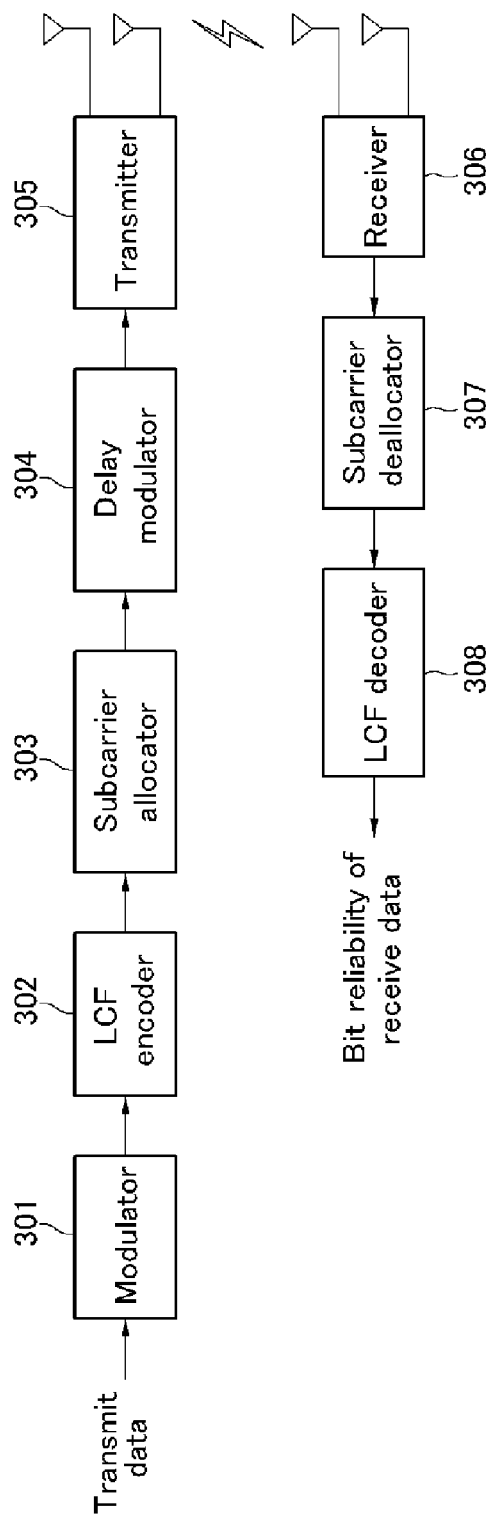
[Fig. 3]

[Fig. 4]
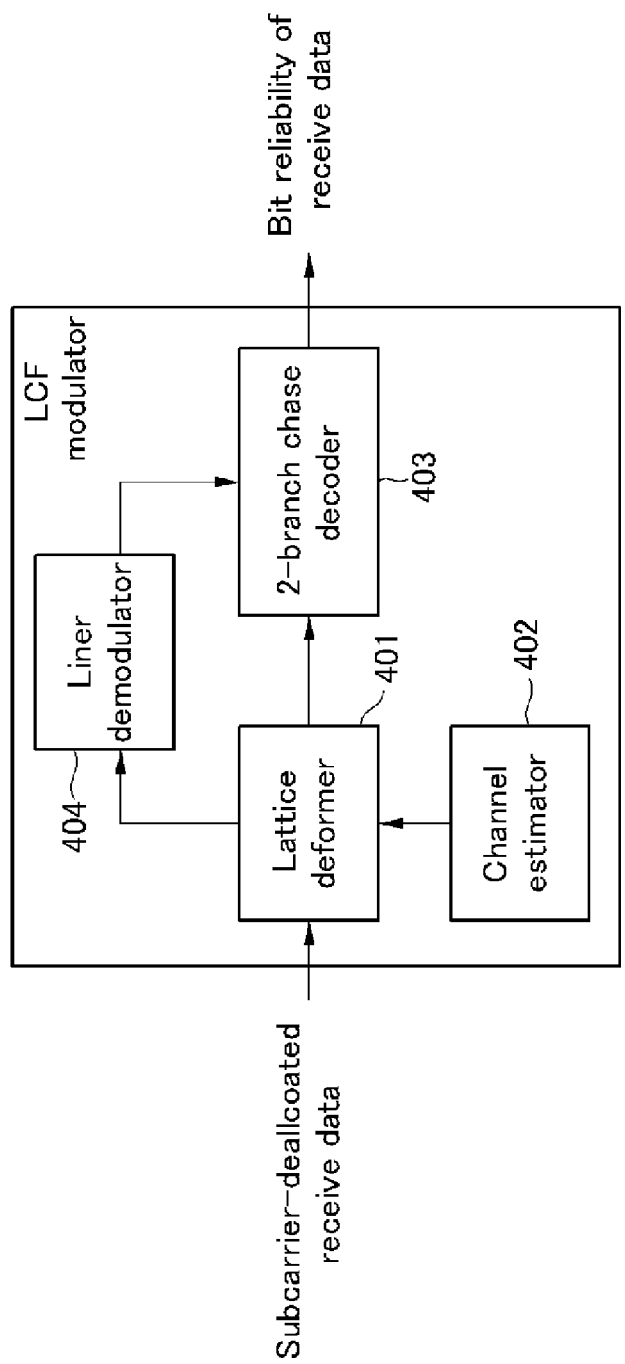

[Fig. 5]
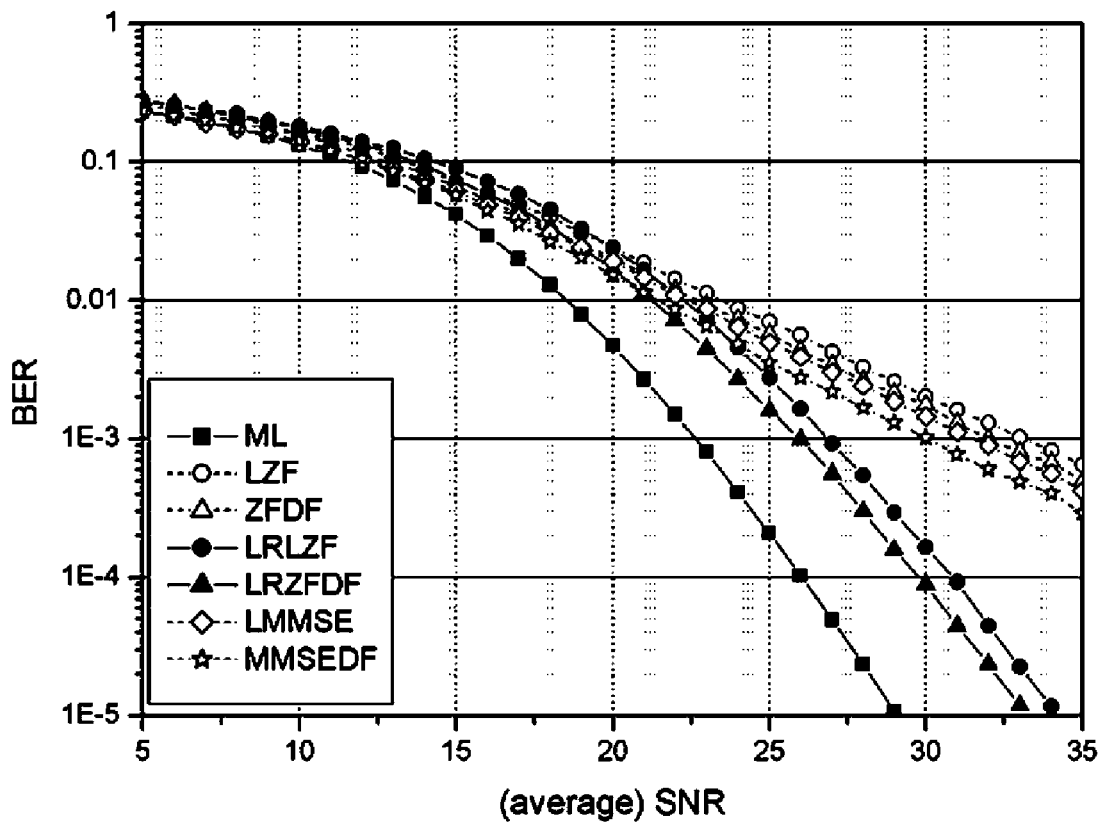
Bit error probability graph (4 dimension, 16 QAM)
according to Lattice-reduction
ML: Maximum likelihood detection
LZF: Liner ZF detection
ZFDF; ZF Decision Feedback detection
LMMSE; Liner MMSE detection
MMSEDF; MMSE Decision Feedback detection
LRLZF; Lattice-reduced liner ZF detection
LRZFDF; Lattice-reduced liner ZF Decision Feedback detection

[Fig. 6]
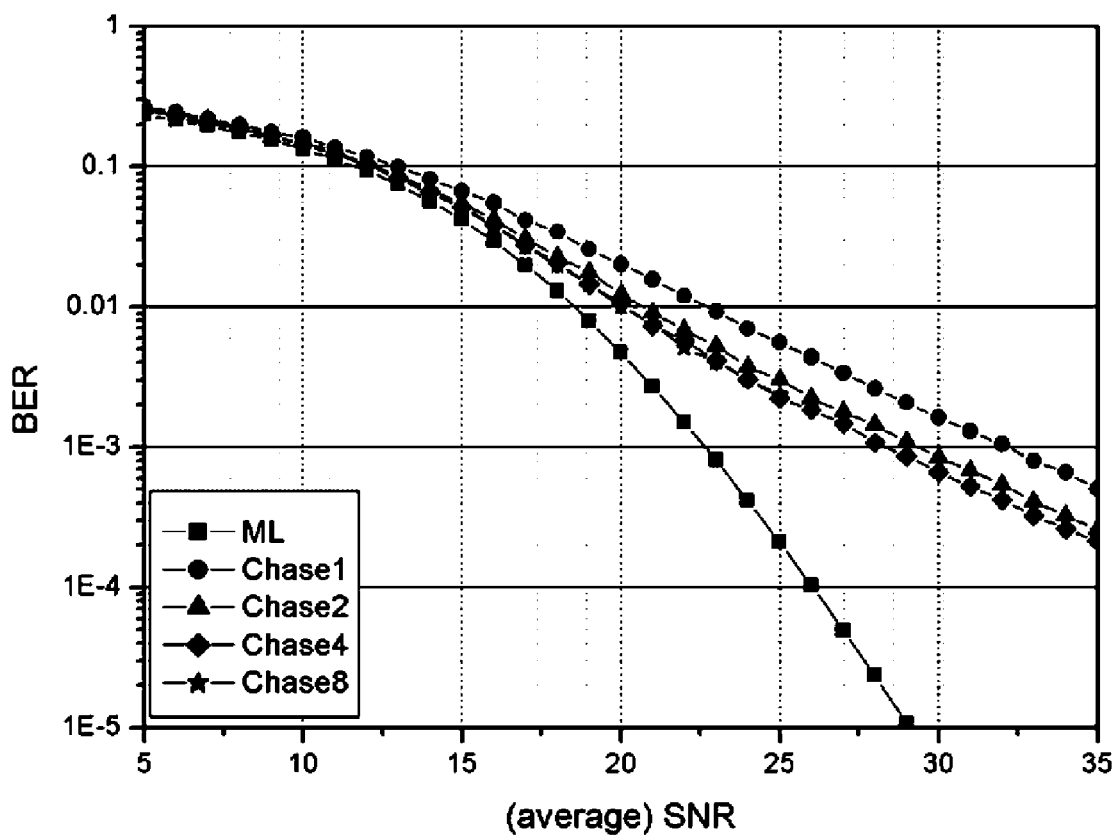
Bit error probability graph (4 dimension, 16 QAM)
according to increase of the number of survivor paths of
2-Branch Chase demodulator
ML: Maximum likelihood detection
Chase n: Chase detection using n numbered paths

[Fig. 7]
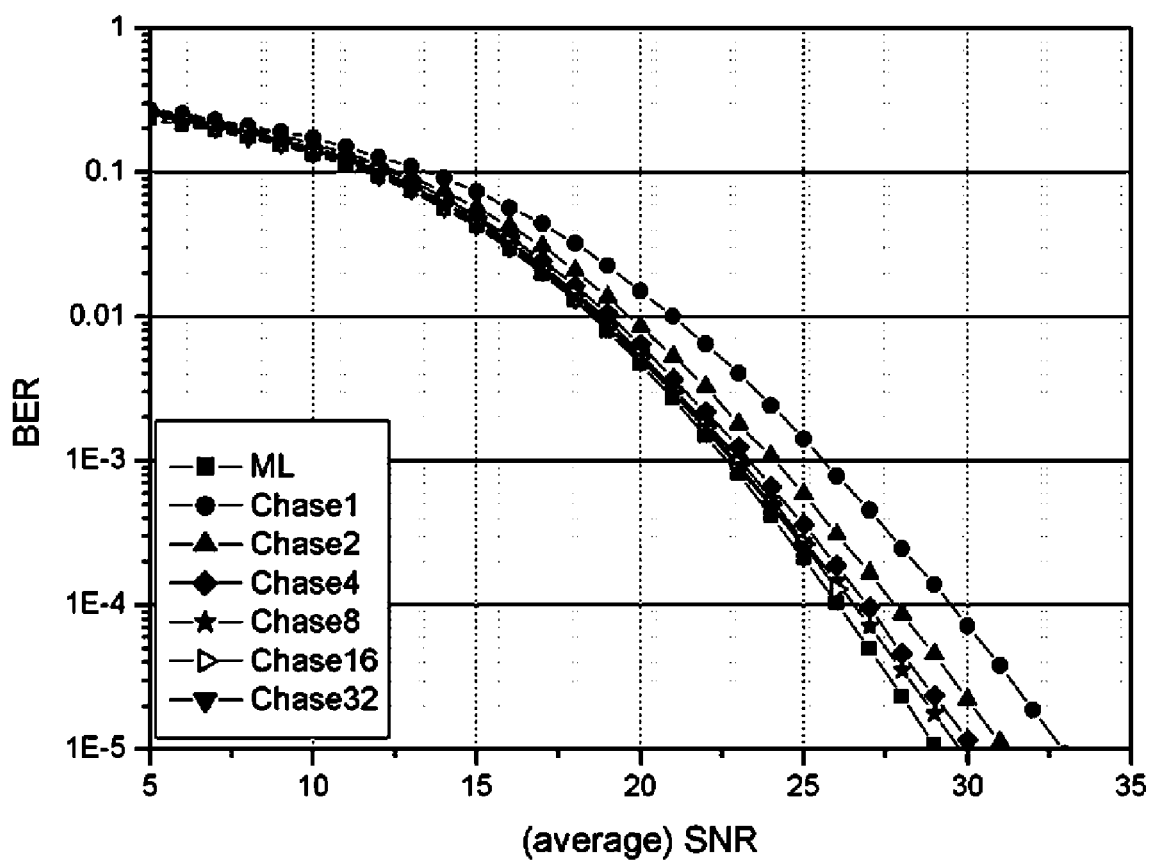
Bit error probability graph (4 dimension, 16 QAM) according to increase of the number of survivor paths of 2-Branch Chase demodulator linked to lattice deformer
ML: Maximum likelihood detection
Chase n: Chase detection using n numbered paths linked to lattice deformer

US 7,773,500 B2

TRANSMITTING APPARATUS FOR TRANSMITTING IN A MULTI-CARRIER SYSTEM USING MULTIPLE ANTENNAS AND RECEIVING APPARATUS IN THE SAME SYSTEM

TECHNICAL FIELD

The present invention relates to a multi-carrier system using multiple antennas. More particularly, the present invention relates to a transmitting apparatus using an Algebraic Liner Precoder for a plurality of subcarriers and a receiving apparatus using a lattice reduction and Chase detection method in a multi-carrier system using multiple antennas.

BACKGROUND ART

An OFDM scheme has been considered so as to transmit wideband high-speed data. The OFDM scheme transmits a using bandwidth by dividing the using band into a plurality of subcarriers. The OFDM scheme may provide channel selectivity between separated subcarriers using a wideband channel, and accordingly, such channel diversity may improve performance of a channel encoder. The liner precoding may obtain diversity in a demodulator by multiplying a liner complex matrix by a transmit signal transmitted through the plurality of subcarriers. A paper "Signal Space Diversity: A Power- and Bandwidth-Efficient Diversity Technique for the Rayleigh Fading Channel" discloses a liner complex design method for obtaining the maximum channel diversity, which is published in the IEEE Transactions on Information Theory (Boutros etc., 1998. 6). For example, the OFDMA system using n-numbered (n is a natural number greater than 1) subcarriers may perform a modeling as Equation 1 by using this liner precoding.

$$\begin{bmatrix} y_1 \\ y_2 \\ \vdots \\ y_n \end{bmatrix} = \begin{bmatrix} h_1 & 0 & \cdots & 0 \\ 0 & h_2 & \ddots & \vdots \\ \vdots & \ddots & \ddots & 0 \\ 0 & \cdots & 0 & h_n \end{bmatrix} U_n \begin{bmatrix} x_1 \\ x_2 \\ \vdots \\ x_n \end{bmatrix} + \begin{bmatrix} w_1 \\ w_2 \\ \vdots \\ w_n \end{bmatrix} \quad \text{(Equation 1)}$$

When it is given that $1 \leq i \leq n$, $x_i$ is given as a transmit signal of Binary Phase Shift Keying (BPSK), Quadrature Phase Shift Keying (QPSK), 16 Quadrature Amplitude Modulation (16QAM), and 64QAM etc., and $h_i$ is given as a channel for each subcarrier. $y_i$ is given as a receive signal. $w_i$ is a noise added to the receive signal. In Equation 1, the maximum diversity gain may be obtained by designing well n×n of a liner complex matrix $U_n$.

Generally, it is difficult for the maximum likelihood detection to be applied to the liner precoding system. The maximum likelihood symbol may be detected by applying a Sphere Decoding to a deformed channel matrix when a product of the channel matrix and the liner complex matrix $U_n$ is given as the deformed channel matrix, and a performance approaching the maximum likelihood may be detected by a liner receiver (Zero Forcing detection or MMSE detection) after applying the lattice reduction to the deformed channel matrix. A paper "A Very Efficient Lattice Reduction Tool on Fast Fading Channels" published in the International Symposium on Information Theory and its Applications (Rekaya, etc., 2004. 10) discloses an algebraic lattice reduction scheme capable of simply being applied to the precoding system by using the algebraically designed liner complex matrix.

The liner precoding is applied to the OFDMA system so as to obtain frequency diversity on demodulation, while the multiple antennas are applied to the OFDMA system so as to obtain space diversity. A paper "A Simple Transmit Diversity Technique for Wireless Communications" published in the IEEE Journal on Select Areas in Communications (Alamouti, 1998. 10) discloses a space time block code (STBC) design. The space time block code is designed to obtain a diversity gain because a receiver may simply process a signal when two transmit antennas are used and two transmit signals are transmitted using a complex orthogonal design. Such a space time block code may be easily connected to the OFDMA system when they are transmitted over two times for each subcarrier or transmitted over two adjacent subcarriers.

In addition, a paper "Multi-carrier Delay Diversity Modulation for MIMO Systems" published in the IEEE Transaction on Wireless Communications (Tan etc. 2004. 9) discloses that such a space time block code is transmitted with a predetermined delay provided by a time domain for the respective multiple transmit antennas, and accordingly a diversity may be obtained in the frequency domain, and performance may be improved using the channel encoder. At this time, the same receiver as when using one single transmit antenna may be used.

To summarize, the liner precoded multi-carrier system is designed to obtain a frequency diversity gain. In addition, the space time block codes (STBC) are designed to obtain a space diversity gain. The delay diversity applied to the multi-carrier system is designed to obtain a gain by deforming space diversity into frequency diversity.

However, the conventional multi-carrier system has bad performance because the space diversity using the multiple antennas and the frequency diversity using the OFDMA system are used together. Also, it undergoes performance degradation because the lattice reduction detection method has a boundary effect, and accordingly, severe fading occurs on the radio channel.

The above information disclosed in this Background section is only for enhancement of understanding of the background of the invention and therefore it may contain information that does not form the prior art that is already known in this country to a person of ordinary skill in the art.

DETAILED DESCRIPTION

Technical Problem

The present invention has been made in an effort to provide a transmitting apparatus using a liner precoder and a receiving apparatus using a hard and soft decision demodulation scheme using a lattice reduction/Chase detection method of a multi-carrier system using multiple antennas having advantages of obtaining frequency diversity gain and space diversity gain together by using a liner precoder, providing a hard and soft decision maximum likelihood performance by proposing a 2-branch Chase detection method so as to compensate a performance degradation due to a boundary effect of a lattice reduction detection method.

An exemplary embodiment of the present invention provides a transmitting apparatus of a multi-carrier system using multiple antennas including: a linear complex field (LCF) encoder for performing a liner precoding to input signals to be transmitted to a receiving apparatus using a liner complex matrix considering the number of multiple antennas and the number of subcarriers;

a subcarrier allocator for respectively allocating a subcarrier to the signals liner-precoded by the LCF encoder; and,

Technical Solution a transmitter for respectively transmitting the signals having a subcarrier allocated by the subcarrier allocator through the multiple antennas externally.

Another embodiment of the present invention provides a transmitting apparatus of a multi-carrier system using multiple antennas including:

a linear complex field encoder for performing a liner precoding to input signals to be transmitted to a receiving apparatus using a liner complex matrix considering the number of subcarriers;

a subcarrier allocator for respectively allocating a subcarrier to the signals liner-precoded by the LCF encoder;

a space-time block codes (STBC) coder for outputting coded signals by performing orthogonal space-time block codes to the signals having a subcarrier allocated by the subcarrier allocator through the multiple antennas externally; and a transmitter for transmitting the signals output by the STBC encoder through the multiple antennas externally.

Yet another embodiment of the present invention provides a transmitting apparatus of a multi-carrier system using multiple antennas including:

a linear complex field encoder for performing a liner precoding to input signals to be transmitted to a receiving apparatus using a liner complex matrix considering the number of subcarriers;

a subcarrier allocator for respectively allocating a subcarrier to the signals liner-precoded by the LCF encoder;

a delay modulator for deforming the signal having the subcarrier allocated by the subcarrier allocator from a frequency-domain signal to a time-domain signal and for encoding the deformed signals to be delayed such that they are cycled for the respective multiple antennas; and a transmitter for transmitting the signals output by the delay modulator through the multiple antennas externally. Yet another embodiment of the present invention provides a receiving apparatus of a multi-carrier system using multiple antennas including: a receiver for respectively receiving a transmit signal through multiple antennas from a transmitting apparatus;

a subcarrier de-allocator for extracting a liner-precoded signal by de-allocating a subcarrier allocated to the received signal; and an LCF decoder for outputting a bit reliability of the received signal to the liner-precoded signal extracted from the subcarrier de-allocator considering the number m of multiple antennas and the number n of subcarriers.

Yet another embodiment of the present invention provides a receiving apparatus of a multi-carrier system using multiple antennas including: a receiver for respectively receiving a transmit signal through the multiple antennas from a transmitting apparatus;

a space-time block codes decoder for decoding signals by performing an orthogonal space-time block code decoding on the received signals; and a subcarrier de-allocator for extracting a liner-precoded signal by de-allocating a subcarrier allocated to the decoded signal; and an LCF decoder for outputting a bit reliability of the received signal to the liner-precoded signal extracted from the subcarrier de-allocator.

ADVANTAGEOUS EFFECTS

Brief Description of the Drawings

FIG. 1 is a schematic diagram of a multi-carrier system having multiple antennas using a liner precoder according to a first exemplary embodiment of the present invention.

FIG. 2 is a schematic diagram of a multi-carrier system having multiple antennas using a liner precoder and space time block codes (STBC) according to a second exemplary embodiment of the present invention.

FIG. 3 is a schematic diagram of a multi-carrier system having multiple antennas using a liner precoder and a transmit delay according to a third exemplary embodiment of the present invention.

FIG. 4 is a block diagram of a linear complex field (LCF) decoder according to an exemplary embodiment of the present invention.

FIG. 5 is a bit error probability graph according to a lattice reduction when 4-dimension and 16QAM modulation schemes are used.

FIG. 6 is a bit error probability graph according to a survivor path number increase of a 2-branch Chase decoder when 4-dimension and 16QAM modulation schemes are used.

FIG. 7 is a bit error probability graph according to a survivor path number increase of a 2-branch Chase decoder linked with a lattice reducer when 4-dimension and 16QAM modulation schemes are used.

BEST MODE

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When it is described that an element is coupled to another element, the element may be directly coupled to the other element or coupled to the other element through a third element.

According to an exemplary embodiment of the present invention, a method for obtaining a frequency diversity gain and a space diversity gain together may be proposed by using a liner precoder in a multi-carrier system using multiple antennas. In addition, in order to compensate performance degradation due to the boundary effect of the lattice reduction detection method, a 2-branch Chase detection method may be proposed, and accordingly, a hard and soft decision maximum likelihood performance may be obtained.

According to an exemplary embodiment of the present invention, three transmit and decoding schemes may be proposed in a multi-carrier system using multiple antennas.

First, the multi-carrier system having the multiple antennas uses a precoding scheme considering a plurality of transmit antennas and a plurality of subcarriers. In this case, since a dimension of a product of m-numbered (m is a natural number greater than 1) transmit antennas and n-numbered (n is a natural number greater than 1) subcarriers used along with the transmit antennas is given as mn, an mn dimensional liner precoder matrix is applied and an mn dimensional decoder is applied for a decoder on decoding.

Second, the multi-carrier system having the multiple antennas performs a precoding using n-numbered subcarriers and then applies orthogonal space time block codes to a symbol. In this case, the orthogonal space time block codes and the precoder may be respectively and separately decoded.

Third, the delay diversity scheme is applied to the symbol precoded over the n-numbered subcarriers. The delay diversity-applied OFDMA system may not have the maximum diversity gain when a hamming distance of the channel encoding of the allocated subcarrier is equal to or greater than the number of antennas. The OFDMA system may obtain the maximum diversity gain regardless of the channel encoding when the liner precoding is applied. In addition, the same receiver as when using one single transmit antenna is used, and accordingly, a decoder of an n-dimensional precoder is applied.

In addition, according to an exemplary embodiment of the present invention, a decoder scheme for simply obtaining a hard decision value and a soft decision value of a quasi-maximum likelihood is proposed using the above-noted three transmit schemes.

FIG. 1 is a schematic diagram of a multi-carrier system having multiple antennas using a liner precoder according to a first exemplary embodiment of the present invention.

As shown in FIG. 1, a multi-carrier system having multiple antennas using a liner precoder according to a first exemplary embodiment of the present invention includes a transmitting apparatus having a plurality of transmit antennas, a modulator 101, a linear complex field (LCF) encoder 102, a subcarrier allocator 103, and a transmitter 104, and a receiving apparatus having a plurality of receiving antennas, a receiver 105, a subcarrier de-allocator 106, and an LCF decoder 107.

According to an exemplary embodiment of the present invention, a multi-subcarrier system using m-numbered (m is a natural number greater than 1) transmit antennas and n-numbered (n is a natural number greater than 1) subcarriers is considered. The n-numbered subcarriers may be randomly allocated to an entire frequency bandwidth.

The modulator 101 modulates a binary signal input as transmit data into a BPSK, QPSK, 16QAM, and 64QAM.

The LCF encoder 102 receives modulated symbols from the modulator 101 and performs a precoding to the modulated symbols using a liner complex matrix.

The subcarrier allocator 103 allocates the precoded and modulated symbols as available subcarriers.

The transmitter 104 transmits a signal by allocating the signal through the plurality of transmit antennas.

The receiver 105 receives the transmitted signal through at least one of the plurality of receiving antennas.

The subcarrier de-allocator 106 allocates the received signal as the available subcarriers.

The LCF decoder 107 decodes the subcarrier de-allocator allocated signal according to the liner complex matrix.

Referring to FIG. 1, the LCF encoder 102 performs a precoding to the modulated symbols using the liner complex matrix as Equation 2 for mn-numbered output values of the modulator 101.

$$\begin{bmatrix} a_1 \\ a_2 \\ \vdots \\ a_{mn} \end{bmatrix} = U_{mn} \begin{bmatrix} x_1 \\ x_2 \\ \vdots \\ x_{mn} \end{bmatrix} \quad \text{(Equation 2)}$$

The subcarrier allocator 103 allocates n-numbered subcarriers as Equation 3 to mn-numbered output values $a_i$ of the LCF encoder 102.

$$b_j(i) = a_{m(i-1)+j} \text{ for } 1 \leq i \leq n, 1 \leq j \leq m \quad \text{(Equation 3)}$$

$b_j(i)$ is given as a j-th signal allocated to an i-th subcarrier.

The transmitter 104 transmits mm-numbered output values $b_j(i)$ of the subcarrier allocator 103 as Equation 4.

$$\begin{bmatrix} c_{11} & 0 & \cdots & 0 \\ 0 & c_{22}(i) & \ddots & \vdots \\ \vdots & \ddots & \ddots & 0 \\ 0 & \cdots & 0 & c_{mm}(i) \end{bmatrix} = \begin{bmatrix} 1 & 0 & \cdots & 0 \\ 0 & 1 & \ddots & \vdots \\ \vdots & \ddots & \ddots & 0 \\ 0 & \cdots & 0 & 1 \end{bmatrix} \begin{bmatrix} b_1(i) \\ b_2(i) \\ \vdots \\ b_m(i) \end{bmatrix} \quad \text{(Equation 4)}$$

for $1 \leq i \leq n$ $c_{jk}(i)$ is a signal transmitted at a k-th time using a j-th transmit antenna from an i-th subcarrier.

The receiver 105 inversely performs a mapping of Equation 4.

When the subcarrier de-allocator 106 inversely performs a mapping of Equation 3, mn-numbered input values of the LCF decoder 107 may be expressed as Equation 5.

$$\begin{bmatrix} y_1 \\ y_2 \\ \vdots \\ y_{mn} \end{bmatrix} = \begin{bmatrix} h_1 & 0 & \cdots & 0 \\ 0 & h_2 & \ddots & \vdots \\ \vdots & \ddots & \ddots & 0 \\ 0 & \cdots & 0 & h_{mn} \end{bmatrix} U_{mn} \begin{bmatrix} x_1 \\ x_2 \\ \vdots \\ x_{mn} \end{bmatrix} + \begin{bmatrix} w_1 \\ w_2 \\ \vdots \\ w_{mn} \end{bmatrix} \quad \text{(Equation 5)}$$

When it is given as $1 \leq i \leq mn$, $h_i$ means a channel for the respective antennas and the respective subcarriers. $w_i$ is a noise added to the receive signal. Equation 5 is the same as Equation 1 except that a dimension thereof is given as mn. Accordingly, a bit reliability of receive data may be calculated using the given decoder or a soft and hard decision liner precoder decoder according to an exemplary embodiment shown in FIG. 4.

FIG. 2 is a schematic diagram of a multi-carrier system having multiple antennas using a liner precoder and space time block codes (STBC) according to a second exemplary embodiment of the present invention.

As shown in FIG. 2, a multi-carrier system having multiple antennas using a liner precoder and STBC according to a second exemplary embodiment of the present invention includes a transmitting apparatus having a modulator 201, an LCF encoder 202, a subcarrier allocator 203, a STBC encoder 204, a transmitter 205, and a plurality of transmit antennas, and a receiving apparatus having a plurality of receiving antennas, a receiver 206, an STBC decoder 207, a subcarrier de-allocator 208, and an LCF decoder 209.

The modulator 201 modulates a binary signal input as a transmit data into a BPSK, QPSK, 16QAM, and 64QAM.

The LCF encoder 202 performs a precoding to the modulated symbols using a liner complex matrix as Equation 6 for mn-numbered output values $x_i$ of the modulator 201.

$$\begin{bmatrix} a_{n(j-1)+1} \\ a_{n(j-1)+2} \\ \vdots \\ a_{n(j-1)+n} \end{bmatrix} = U_n \begin{bmatrix} x_{n(j-1)+1} \\ x_{n(j-1)-2} \\ \vdots \\ x_{n(j-1)-n} \end{bmatrix} \text{ for } 1 \leq j \leq m \quad \text{(Equation 6)}$$

The subcarrier allocator 203 allocates mn-numbered output values $a_j$ of the LCF encoder 202 to the n-numbered subcarriers as Equation 7.

$$b_j(i) = a_{n(j-1)+i} \text{ for } 1 \leq i \leq n, 1 \leq j \leq m \quad \text{(Equation 7)}$$

$b_j(i)$ is given as a j-th signal allocated to an i-th subcarrier.

The STBC encoder 204 performs orthogonal space-time block codes to the mn-numbered output values $b_j(i)$ of the subcarrier allocator 203 using m-numbered signals allocated to the i-th subcarrier. In this case, it is expressed as Equation 8 when the Alamouti method using two transmit antennas is applied.

$$\begin{bmatrix} c_{11}(i) & c_{12}(i) \\ c_{21}(i) & c_{21}(i) \end{bmatrix} = \begin{bmatrix} b_1(i) & -b_2^*(i) \\ b_2(i) & b_1^*(i) \end{bmatrix} \text{ for } \leq i \leq n \quad \text{(Equation 8)}$$

The transmitter 205 transmits $c_{jk}(i)$ to $m^2 n$-numbered output values $c_{jk}(i)$ of the STBC encoder 204 at a k-th time using a j-th transmit antenna of an i-th subcarrier.

The receiver 206 receives a signal through the multiple antennas.

The STBC decoder 207 receives a signal through the multiple antennas from the receiver 206 and decodes the received signal using the Alamouti method as Equation 9.

$$\tilde{y}_1(i) = \tilde{h}(i) \cdot b_1(i) + \tilde{w}_1(i)$$

for $1 \leq i \leq n$ $$\tilde{y}_2(i) = \tilde{h}(i) \cdot b_2(i) + \tilde{w}_2(i) \quad \text{(Equation 9)}$$

$\tilde{y}_j(i)$ is a j-th signal received from the Alamouti decoding method-deformed i-th subcarrier. $\tilde{w}_j(i)$ is a j-th noise added to the Alamouti decoding method-deformed i-th subcarrier. $\tilde{h}(i)$ is a channel value of the Alamouti decoding method-deformed i-th subcarrier.

The subcarrier de-allocator 208 inversely performs a mapping of Equation 7 to the mn-numbered output values $\tilde{y}_j(i)$ of the STBC decoder 207, Equation 7, and accordingly, the mn-numbered output values $\tilde{y}_j(i)$ are expressed as Equation 10.

$$\begin{bmatrix} \tilde{y}_j(1) \\ \tilde{y}_j(2) \\ \vdots \\ \tilde{y}_j(n) \end{bmatrix} = \begin{bmatrix} \tilde{h}(1) & 0 & \cdots & 0 \\ 0 & \tilde{h}(2) & \ddots & \vdots \\ \vdots & \ddots & \ddots & 0 \\ 0 & \cdots & 0 & \tilde{h}(n) \end{bmatrix} U_n \begin{bmatrix} x_{n(j-1+1)} \\ x_{n(j-1+2)} \\ \vdots \\ \tilde{w}_j(n) \end{bmatrix} + \begin{bmatrix} \tilde{x}_j(1) \\ \tilde{x}_j(2) \\ \vdots \\ \tilde{x}_j(n) \end{bmatrix} \quad \text{(Equation 10)}$$

for $1 \leq j \leq m$

Equation 10 is the same as Equation 1 except that the deformed channel and receive signal and noise are used. Accordingly, a bit reliability of receive data may be calculated using the given decoder or a soft and hard decision liner precoder decoder according to an exemplary embodiment shown in FIG. 4.

FIG. 3 is a schematic diagram of a multi-carrier system having multiple antennas using a liner precoder and a transmit delay according to a third exemplary embodiment of the present invention.

As shown in FIG. 3, according to a third exemplary embodiment of the present invention, a multi-carrier system using multiple antennas having a transmit delay and a liner precoder includes a transmitting apparatus having a modulator 301, an LCF encoder 302, a subcarrier allocator 303, a delay modulator 304, a transmitter 305, and a plurality of transmit antennas, and a receiving apparatus having a plurality of receiving antennas, a receiver 306, a subcarrier de-allocator 307, and an LCF decoder 308.

The modulator 301 modulates a binary signal input as transmit data into a BPSK, QPSK, 16QAM, and 64QAM.

The LCF encoder 202 performs a precoding to the modulated symbols using a liner complex matrix as Equation 11 for n-numbered output values $x_i$ of the modulator 201.

$$\begin{bmatrix} a_1 \\ a_2 \\ \vdots \\ a_n \end{bmatrix} = U_n \begin{bmatrix} x_1 \\ x_2 \\ \vdots \\ x_n \end{bmatrix} \quad \text{(Equation 11)}$$

The subcarrier allocator 203 allocates n-numbered output values DeletedTextsof the LCF encoder 202 to the n-numbered subcarriers as Equation 12.

$$\begin{bmatrix} b(1) \\ b(2) \\ \vdots \\ b(n) \end{bmatrix} = \begin{bmatrix} a_1 \\ a_2 \\ \vdots \\ a_n \end{bmatrix} \quad \text{(Equation 12)}$$

b(i) is given as a signal allocated to an i-th subcarrier.

The delay modulator 304 deforms a signal of frequency domain into a signal of time domain for n-numbered output values b(i) of the subcarrier allocator 302, calculates n-numbered B(k), and performs a cyclically delayed encoding by one sample for the respective antennas as Equation 13.

$$\begin{bmatrix} c_{11} & c_{12} & \cdots & c_{1n} \\ c_{21} & c_{22} & \cdots & c_{2n} \\ \vdots & \vdots & \ddots & \vdots \\ c_{m1} & c_{m2} & \cdots & c_{mn} \end{bmatrix} = \begin{bmatrix} B(1) & B(2) & \cdots & B(n) \\ B(n) & B(1) & \cdots & B(n-1) \\ \vdots & \vdots & \ddots & \vdots \\ B(n-m+2) & B(n-m+3) & \cdots & B(n-m+1) \end{bmatrix}$$

The transmitter 305 transmits $C_{jk}$ at a k-th time using a j-th transmit antenna for mn-numbered output values $C_{jk}$ of the delay modulator 304.

With such a transmitting method, diversity, and performance may be obtained without using a channel encoding regardless of a minimum hamming distance of a channel encoding and a distribution interleaved thereof using the maximum diversity standard introduced by a paper "Multi-carrier Delay Diversity Modulation for MIMO Systems" published in the IEEE Transaction on Wireless Communications (Tan etc., 2004. 9).

The receiver 306 is the same as the OFDM receiver using one transmit antenna.

The subcarrier de-allocator 307 performs an inverse mapping of Equation 12 for the output of the receiver 306 and thus may express the output of the receiver 306 as Equation 14.

$$\begin{bmatrix} y_1 \\ y_2 \\ \vdots \\ y_n \end{bmatrix} = \begin{bmatrix} h_1 & 0 & \cdots & 0 \\ 0 & h_2 & \ddots & \vdots \\ \vdots & \ddots & \ddots & 0 \\ 0 & \cdots & 0 & h_n \end{bmatrix} U_n \begin{bmatrix} x_1 \\ x_2 \\ \vdots \\ x_n \end{bmatrix} + \begin{bmatrix} w_1 \\ w_2 \\ \vdots \\ w_n \end{bmatrix} \quad \text{(Equation 14)}$$

Equation 14 is the same as Equation 1 using one single transmit antenna. Accordingly, a bit reliability of receive data may be obtained using the given decoder or a soft and hard decision liner precoder decoder according to an exemplary embodiment of the present invention shown in FIG. 4.

FIG. 4 is a block diagram of a linear complex field (LCF) decoder according to an exemplary embodiment of the present invention.

As shown in FIG. 4, an LCF decoder according to an exemplary embodiment of the present invention includes a lattice deformer 401, a channel estimator 402, a 2-branch Chase decoder 403, and a liner demodulator 404.

The lattice deformer 401 receives a receive signal from the subcarrier de-allocator and performs a lattice reduction as Equation 15 using a matrix multiplied with estimated channel values of the channel estimator 402 and a precoder matrix.

The channel estimator 402 deforms and estimates a channel for the respective subcarriers using a pilot, etc.

The 2-branch Chase decoder 403 calculates a maximum likelihood value or each different maximum likelihood value for the respective bits using the 2-branch Chase decoder and outputs a bit-reliability of the receive data.

The liner demodulator 404 uses a liner Zero Forcing (ZF) or Minimum Mean Square Error (MMSE) demodulator.

$$\begin{bmatrix} y_1 \\ y_2 \\ \vdots \\ y_n \end{bmatrix} = \begin{bmatrix} h_1 & 0 & \cdots & 0 \\ 0 & h_2 & \ddots & \vdots \\ \vdots & \ddots & \ddots & 0 \\ 0 & \cdots & 0 & h_n \end{bmatrix} U T_n^{-1} T_n \begin{bmatrix} x_1 \\ x_2 \\ \vdots \\ x_n \end{bmatrix} + \begin{bmatrix} w_1 \\ w_2 \\ \vdots \\ w_n \end{bmatrix} \quad \text{(Equation 15)}$$

(Equation 13)

-continued $$= \begin{bmatrix} h_1 & 0 & \cdots & 0 \\ 0 & h_2 & \ddots & \vdots \\ \vdots & \ddots & \ddots & 0 \\ 0 & \cdots & 0 & h_n \end{bmatrix} U T_n^{-1} \begin{bmatrix} \tilde{x}_1 \\ \tilde{x}_2 \\ \vdots \\ \tilde{x}_n \end{bmatrix} - \begin{bmatrix} w_1 \\ w_2 \\ \vdots \\ w_n \end{bmatrix}$$

$T_u$ has elements of integers and is a uni-modular matrix having the determinant absolute value 1. The conventional Lenstar-Lenstra-Lovasz (LLL) algorithm, etc., may be used for all types of liner complex matrix U, but a complexity thereof is high. When they are precoded using an algebraically designed liner complex matrix U, $T_u$ may be calculated using an algebraic lattice reduction proposed by a paper entitled "A Very Efficient Lattice Reduction Tool on Fast Fading Channels" published in the International Symposium on Information Theory and its Applications (Rekaya etc., 2004. 10). When such an algebraic lattice reduction is applied and then demodulation is performed using a liner ZF or a liner MMSE to the deformed channel matrix, it appears to have the same slope as the maximum likelihood detection performance. That is, in this case, the maximum diversity gain may be obtained. However, the transmit signal may have performance degradation due to a boundary effect of the finite lattice and performance degradation due to the increase of the dimension n.

FIG. 5 is a bit error probability graph according to a lattice reduction when 4-dimension and 16QAM modulation schemes are used. Although a similar slope as the maximum likelihood detection may be provided by the lattice reduction method, performance degradation of about 3 to 4 dB may occur.

A Chase detection method uses a plurality of survivor paths on decision feedback. Values of all branches attached to the present survivor path are calculated and added to the given survivor path, and thus, a new survivor path may be selected, wherein these manners are repeated. Comparing the Chase detection method to the given method, when the survivor path is given as 1, it is the same as the Decision Feedback detection, while when all paths are given as the survivor path, it is the same as the maximum likelihood detection method. Such a Chase detection method may improve performance according to the increase of the number of survivor paths, but increases a complexity. In addition, since such a Chase detection method must calculate the values of all the branches attached to the survivor path, the complexity is increased according to the QAM dimension of the transmit signal.

FIG. 6 is a bit error probability graph according to a survivor path number increase of a 2-branch Chase decoder when 4-dimension and 16QAM modulation schemes are used. It may be known that a 2-branch Chase decoder has a lower complexity than the standard value and has no further improved performance regardless of the increase of the survivor paths.

When the number of survivor paths is increased while the lattice deformer 401 and the 2-branch Chase decoder 403 are linked as shown in FIG. 4, the complexity may be simplified and the similar performance as the maximum likelihood detection may be obtained as shown in FIG. 7.

FIG. 7 is a bit error probability graph according to a survivor path number increase of a 2-branch Chase decoder linked with a lattice reducer when 4-dimension and 16QAM modulation schemes are used.

The linking of the lattice deformer 401 and the 2-branch Chase decoder 403 may be performed as follows.

The lattice deformer 401 performs a lattice reduction as Equation 15 using a matrix multiplied with the channel value estimated by the channel estimator 402 and the precoder matrix.

The liner demodulator 404 performs a liner ZF or liner MMSE demodulation to the lattice-reduced channel and thus calculates a soft decision for the respective dimensions.

The 2-branch Chase decoder 403 uses two nearest lattice points among the soft decision values for the respective dimensions, performs a 2-branch Chase demodulation, and repeats an update process for updating a survivor path by the given number.

When the 2-branch Chase decoder 403 performs a hard decision, the minimum survivor path is selected from among the matrixes of the n-dimensional survivor paths.

When the 2-branch Chase decoder 403 performs a soft decision, it makes a list to have the matrixes of the n-dimensional survivor Chase paths and calculates a minimum survivor path having an inverse bit of the minimum survivor path for each bit among the values of the list as well as the minimum survivor path. When there is no such survivor path, the matrix value of the maximum survivor path among the list is used or the predetermined constant value of the system is used.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment of the present invention, the multi-carrier system using the multiple antennas may obtain a frequency diversity gain and a space diversity gain together by using the liner precoder. In addition, a performance may be improved by using a space diversity due to the multiple antennas and a frequency diversity due to the OFDMA system so as to prevent a performance degradation due to the severe fading of the radio channel when three transmitting methods are used so as to prevent a performance degradation the present invention. In addition, a multi-carrier system including an LCF decoder using a lattice reduction and a 2-branch Chase decoder may reduce a complexity and obtain a hard decision value of a performance similar to the maximum likelihood detection, and may improve a performance by the linkage of the soft decision channel decoder using a soft decision algorithm.

What is claimed is:

1. A transmitting apparatus of a multi-carrier system using multiple antennas comprising:
   a linear complex field (LCF) encoder for performing a linear precoding to input signals to be transmitted to a receiving apparatus using a linear complex matrix considering the number of multiple antennas and the number of subcarriers;
   a subcarrier allocator for respectively allocating a subcarrier to the signals linear-precoded by the LCF encoder; and,
   a transmitter for respectively transmitting the signals having a subcarrier allocated by the subcarrier allocator through the multiple antennas externally, wherein
   the linear complex matrix has a row and column corresponding to a product mn of the number m of multiple antennas and the number n of subcarriers, and
   the LCF encoder performs a precoding to the input signals corresponding to the product mn using the linear complex matrix as follows:

$$\begin{bmatrix} a_1 \\ a_2 \\ \vdots \\ a_{mn} \end{bmatrix} = U_{mn} \begin{bmatrix} x_1 \\ x_2 \\ \vdots \\ x_{mn} \end{bmatrix}$$

wherein, $U_{mn}$ is the linear complex matrix,
$x_i$ is given as the input signal, $1 \leq i \leq mn$, and
$a_i$ is given as a resulting value linear-precoded by the LCF encoder, $1 \leq i \leq mn$.

2. The transmitting apparatus of claim 1, wherein the subcarrier allocator allocates n-numbered subcarriers to the input signals corresponding to the product mn linear-precoded by the LCF encoder as follows:

$$b_j(i) = a_{m(i-1)+j} \text{ for } 1 \leq i \leq n, 1 \leq j \leq m$$

wherein $b_j(i)$ is given as a j-th signal allocated to an i-th subcarrier.

3. The transmitting apparatus of claim 2, wherein the transmitter transmits a j-th signal $b_j(i)$ allocated to an i-th subcarrier by the subcarrier allocator as follows:

$$\begin{bmatrix} c_{11}(i) & 0 & \cdots & 0 \\ 0 & c_{22}(i) & \ddots & \vdots \\ \vdots & \ddots & \ddots & 0 \\ 0 & \cdots & 0 & c_{mm}(i) \end{bmatrix} = \begin{bmatrix} 1 & 0 & \cdots & 0 \\ 0 & 1 & \ddots & \vdots \\ \vdots & \ddots & \ddots & 0 \\ 0 & \cdots & 0 & 1 \end{bmatrix} \begin{bmatrix} b_1(i) \\ b_2(i) \\ \vdots \\ b_m(i) \end{bmatrix} \text{ for } 1 \leq i \leq n$$

wherein, $C_{jk}(i)$ is a signal transmitted at a k-th time using a j-th transmit antenna from an i-th subcarrier.

4. A transmitting apparatus of a multi-carrier system using multiple antennas comprising:
   a linear complex field (LCF) encoder for performing a linear precoding to input signals to be transmitted to a receiving apparatus using a linear complex matrix considering the number of subcarriers;
   a subcarrier allocator for respectively allocating a subcarrier to the signals linear-precoded by the LCF encoder;
   a space-time block codes (STBC) coder for outputting coded signals by performing orthogonal space-time block codes to the signals having a subcarrier allocated by the subcarrier allocator subcarrier through the multiple antennas transmitter externally; and
   a transmitter for transmitting the signals output by the space-time block codes (STBC) encoder through the multiple antennas externally,
   wherein the linear complex matrix has a row and column corresponding to the number n of subcarriers, and
   the LCF encoder performs a precoding to the input signals corresponding to a product mn of the number m of multiple antennas and the number n of subcarriers using the linear complex matrix as follows:

$$\begin{bmatrix} a_{n(j-1)+1} \\ a_{n(j-1)+2} \\ \vdots \\ a_{n(j-1)+n} \end{bmatrix} = U_n \begin{bmatrix} x_{n(j-1)+1} \\ x_{n(j-1)+2} \\ \vdots \\ x_{n(j-1)+n} \end{bmatrix} \text{ for } 1 \le j \le m$$

wherein, U, is given as the linear complex matrix,
$x_{n(j-1)+i}$ is given as the input signal, $1 \le i \le n$, and
$a_{n(j-1)+i}$ given as a resulting value linear-precoded by the LCF encoder, $1 \le i \le n$.

5. The transmitting apparatus of claim 4, wherein the subcarrier allocator allocates n-numbered subcarriers to the input signals corresponding to the product mn linear-precoded by the LCF encoder as follows:
$b_j(i)=a_{m(j-1)+i}$ for $1 \le i \le n$, $1 \le j \le m$ wherein, $b_j(i)$ is given as a j-th signal allocated to an i-th subcarrier.

6. The transmitting apparatus of claim 5, wherein
the STBC encoder performs an orthogonal space-time encoding to mn-numbered output values $b_j(i)$ of the subcarrier allocator using m-numbered signals allocated to the i-th subcarrier as follows:

$$\begin{bmatrix} c_{11}(i) & c_{12}(i) \\ c_{21}(i) & c_{21}(i) \end{bmatrix} = \begin{bmatrix} b_1(i) & -b_2^*(i) \\ b_2(i) & b_1^*(i) \end{bmatrix} \text{ for } 1 \le i \le n$$

wherein, $C_{jk}(i)$ is a signal transmitted at a k-th time using a j-th multi-antenna from an i-th subcarrier.

7. The transmitting apparatus of claim 5, wherein
the delay modulator performs an encoding to the n-numbered output values $b_i$ of the subcarrier allocator delayed such that n-numbered B(k)s deformed from a frequency-domain signal to a time-domain signal are respectively cycled for the respective multiple antennas as follows:

$$\begin{bmatrix} c_{11} & c_{12} & \cdots & c_{1n} \\ c_{21} & c_{22} & \cdots & c_{2n} \\ \vdots & \vdots & \ddots & \vdots \\ c_{m1} & c_{m2} & \cdots & c_{mn} \end{bmatrix} = \begin{bmatrix} B(1) & B(2) & \cdots & B(n) \\ B(n) & B(1) & \cdots & B(n-1) \\ \vdots & \vdots & \ddots & \vdots \\ B(n-m+2) & B(n-m+3) & \cdots & B(n-m+1) \end{bmatrix}$$

wherein, $c_{jk}$ is a signal encoded by a delay modulator so as to be transmitted at a k-th time through j-th multiple antennas.

8. A transmitting apparatus of a multi-carrier system using multiple antennas comprising:
a linear complex field (LCF) encoder for performing a linear precoding to input signals to be transmitted to a receiving apparatus using a linear complex matrix considering the number of subcarriers;
a subcarrier allocator for respectively allocating a subcarrier to the signals linear-precoded by the LCF encoder;
a delay modulator for deforming the signal having the subcarrier allocated by the subcarrier allocator from a frequency-domain signal to a time-domain signal and for encoding the deformed signals to be delayed such that they are cycled for the respective multiple antennas; and
a transmitter for transmitting the signals output by the delay modulator through the multiple antennas externally,
wherein the linear complex matrix has a row and column corresponding to the number n of subcarriers, and the LCF encoder performs a precoding to the input signals corresponding to the number n of the subcarriers using the linear complex matrix as follows:

$$\begin{bmatrix} a_1 \\ a_2 \\ \vdots \\ a_n \end{bmatrix} = U_n \begin{bmatrix} x_1 \\ x_2 \\ \vdots \\ x_n \end{bmatrix}$$

wherein, U, is given as the linear complex matrix,
$x_i$ is given as the input signal, $1 \le i \le n$, and
$a_i$ given as a resulting value linear-precoded by the LCF encoder, $1 \le i \le n$.

9. The transmitting apparatus of claim 8, wherein the subcarrier allocator allocates n-numbered subcarriers to the input signals corresponding to the product mn linear-precoded by the LCF encoder as follows:

$$\begin{bmatrix} b(1) \\ b(2) \\ \vdots \\ b(n) \end{bmatrix} = \begin{bmatrix} a_1 \\ a_2 \\ \vdots \\ a_n \end{bmatrix}$$

wherein, b(i) is given as a signal allocated to an i-th subcarrier.

10. A receiving apparatus of a multi-carrier system using multiple antennas comprising:
a receiver for respectively receiving a transmit signal through multiple antennas from a transmitting apparatus;
a subcarrier de-allocator for extracting a linear-precoded signal by de-allocating a subcarrier allocated to the received signal; and
a linear complex field (LCF) decoder for outputting a bit reliability of the received signal to the linear-precoded signal extracted from the subcarrier de-allocator considering the number m of multiple antennas and the number n of subcarriers,
wherein the subcarrier de-allocator de-allocates a subcarrier allocation to the signal corresponding to the product mn of the number m of multiple antennas and the number n of subcarriers as follows:

$$\begin{bmatrix} y_1 \\ y_2 \\ \vdots \\ y_{mn} \end{bmatrix} = \begin{bmatrix} h_1 & 0 & \cdots & 0 \\ 0 & h_2 & \ddots & \vdots \\ \vdots & \ddots & \ddots & 0 \\ 0 & \cdots & 0 & h_{mn} \end{bmatrix} U_{mn} \begin{bmatrix} x_1 \\ x_2 \\ \vdots \\ x_{mn} \end{bmatrix} + \begin{bmatrix} w_1 \\ w_2 \\ \vdots \\ w_{mn} \end{bmatrix}$$

wherein, $y_i$ is the signal received by the receiver, and $1 \le i \le mn$,
$h_i$ is a channel for the respective multiple antennas and the respective subcarriers,
$w_i$ is a noise added to the signal received by the receiver, and
$x_i$ is an original signal transmitted by the transmitting apparatus.

11. The receiving apparatus of claim 10, wherein the LCF decoder includes:
   a channel estimator for estimating a channel for the respective subcarriers using the signal extracted by the subcarrier de-allocator;
   a lattice deformer for performing a lattice reduction to the signal extracted by the subcarrier de-allocator based on the estimated values of the channel estimator and the linear complex matrix;
   a linear demodulator for performing a linear Zero Forcing (ZF) or Minimum Mean Square Error (MMSE) demodulation to the signal lattice-reduced by the lattice deformer; and
   a 2-branch Chase decoder for outputting a bit reliability of the received signal by using a Chase decoder having two branches for the signals lattice-reduced by the lattice deformer and the signals demodulated by the linear demodulator.

12. The receiving apparatus of claim 11, wherein the 2-branch Chase decoder repeats a survivor path updating by defining two lattice points nearest to soft decision values of each dimension as 2-branch.

13. The receiving apparatus of claim 12, wherein when the 2-branch Chase decoder performs a hard decision, the minimum survivor path is selected among matrix values of the survivor paths calculated up to the n-dimension (n is a natural number).

14. The receiving apparatus of claim 12, wherein when the 2-branch Chase decoder performs a soft decision, it makes a list to have the matrixes of the n-dimensional survivor Chase paths and calculates a minimum survivor path having an inverse bit of the minimum survivor path for each bit among the values of the list as well as the minimum survivor path.

15. The receiving apparatus of claim 14, wherein when there is no minimum survivor path having an inverse bit of the minimum survivor path among the values of the list, the matrix value of the maximum survivor path among the lists is used.

16. A receiving apparatus of a multi-carrier system using multiple antennas comprising:
   a receiver for respectively receiving a transmit signal through multiple antennas from a transmitting apparatus;
   a space-time block codes (STBC) decoder for decoding signals by performing an orthogonal space-time block code decoding to the received signals; and
   a subcarrier de-allocator for extracting a linear-precoded signal by de-allocating a subcarrier allocated to the decoded signal; and
   a linear complex field (LCF) decoder for outputting a bit reliability of the received signal to the linear-precoded signal extracted from the subcarrier de-allocator,
   wherein the STBC decoder performs an orthogonal space-time block code decoding to the received signal as follows:

$$\tilde{y}_1(i) = \tilde{h}(i) \cdot b_1(i) + \tilde{w}_1(i)$$

for $1 \leq i \leq n$ $$\tilde{y}_2(i) = \tilde{h}(i) \cdot b_2(i) + \tilde{w}_2(i)$$

wherein, $\tilde{y}_j(i)$ is a j-th signal from an i-th subcarrier deformed by the STBC decoder,
   $\tilde{w}_j(i)$ is a j-th noise added to an i-th subcarrier deformed by the STBC decoder, and
   $\tilde{h}(i)$ is a channel value of the i-th subcarrier deformed by the STBC decoder.

17. The receiving apparatus of claim 16, wherein the subcarrier allocator allocates a subcarrier allocation to a signal $\tilde{y}_j(i)$ corresponding to a product mn of the number m of multiple antennas and the number n of subcarriers output by the STBC decoder as follows:

$$\begin{bmatrix} \tilde{y}_j(1) \\ \tilde{y}_j(2) \\ \vdots \\ \tilde{y}_j(n) \end{bmatrix} = \begin{bmatrix} \tilde{h}(1) & 0 & \cdots & 0 \\ 0 & \tilde{h}(2) & \ddots & \vdots \\ \vdots & \ddots & \ddots & 0 \\ 0 & \cdots & 0 & \tilde{h}(n) \end{bmatrix} U_n \begin{bmatrix} x_{n(j-1)+1} \\ x_{n(j-1)+2} \\ \vdots \\ x_{n(j-1)+n} \end{bmatrix} + \begin{bmatrix} \tilde{w}_j(1) \\ \tilde{w}_j(2) \\ \vdots \\ \tilde{w}_j(n) \end{bmatrix}$$

for $1 \leq j \leq m$ wherein, $x_{n(j-1)+1}$ is an original signal transmitted by the transmitting apparatus.

18. A receiving apparatus of a multi-carrier system using multiple antennas comprising:
   a receiver for respectively receiving a transmit signal through multiple antennas from a transmitting apparatus;
   a subcarrier de-allocator for extracting a linear-precoded signal by de-allocating a subcarrier allocated to the received signal; and
   a linear complex field (LCF) decoder for outputting a bit reliability of the received signal to the linear-precoded signal extracted from the subcarrier de-allocator considering the number m of multiple antennas and the number n of subcarriers,
   wherein the subcarrier de-allocator de-allocates a subcarrier allocation to the received signal corresponding to the number n of the subcarrier as follows:

$$\begin{bmatrix} y_1 \\ y_2 \\ \vdots \\ y_n \end{bmatrix} = \begin{bmatrix} h_1 & 0 & \cdots & 0 \\ 0 & h_2 & \ddots & \vdots \\ \vdots & \ddots & \ddots & 0 \\ 0 & \cdots & 0 & h_n \end{bmatrix} U_n \begin{bmatrix} x_1 \\ x_2 \\ \vdots \\ x_n \end{bmatrix} + \begin{bmatrix} w_1 \\ w_2 \\ \vdots \\ w_n \end{bmatrix}$$

wherein, $y_i$ is the signal received by the receiver, and $1 \leq i \leq n$,
   $h_i$ is a channel for the respective multiple antennas and the respective subcarriers,
   $w_i$ is a noise added to the signal received by the receiver, and
   $x_i$ is an original signal transmitted by the transmitting apparatus.

* * * * *